United States Patent
Alfred et al.

(10) Patent No.: US 10,766,613 B2
(45) Date of Patent: Sep. 8, 2020

(54) SYSTEM AND METHOD FOR ROTORCRAFT-WEIGHT-ON-WHEELS FLIGHT STATE TRANSITION CONTROL

(71) Applicant: Textron Innovations Inc., Providence, RI (US)

(72) Inventors: Jillian Samantha Alfred, Fort Worth, TX (US); Monica Sibello, Benbrook, TX (US); Robert Earl Worsham, II, Weatherford, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 305 days.

(21) Appl. No.: 15/940,184

(22) Filed: Mar. 29, 2018

(65) Prior Publication Data

US 2019/0161181 A1    May 30, 2019

Related U.S. Application Data

(60) Provisional application No. 62/591,634, filed on Nov. 28, 2017.

(51) Int. Cl.
*B64C 27/57* (2006.01)
*B64C 13/50* (2006.01)
(Continued)

(52) U.S. Cl.
CPC ............ *B64C 27/57* (2013.01); *B64C 13/503* (2013.01); *B64D 45/04* (2013.01); *B64C 25/34* (2013.01); *B64C 2025/325* (2013.01)

(58) Field of Classification Search
CPC . B64C 27/57; B64C 13/503; B64C 2025/325; B64C 25/34; B64C 27/00;
(Continued)

(56) References Cited

U.S. PATENT DOCUMENTS

| 9,915,954 | B2 | 3/2018 | Vallart et al. |
| 2007/0282493 | A1 | 12/2007 | Fanciullo et al. |
| 2013/0325221 | A1* | 12/2013 | Shue ............... B64C 13/04 701/16 |

FOREIGN PATENT DOCUMENTS

| EP | 2672357 A1 | 12/2013 |
| EP | 3091412 A1 | 11/2016 |

(Continued)

*Primary Examiner* — Basil T. Jos
(74) *Attorney, Agent, or Firm* — Slater Matsil, LLP

(57) ABSTRACT

A rotorcraft having a plurality of wheels, each wheel configured to receive weight of the rotorcraft when in contact with a landing surface, a plurality of wheel sensors, each wheel sensor associated with a respective wheel and having circuitry configured to generate a wheel on ground (WOG) signal indicating that the respective wheel is in contact with the landing surface, and a flight control computer (FCC) in signal communication with the plurality of wheel sensors, the FCC operable to execute a first hold loop having a first integrator and providing first control augmentation of a rotorcraft flight system, the FCC further operable to freeze the first integrator according to a number of WOG signals received from the plurality of wheel sensors, the FCC further operable to generate a first control signal according to a first value provided by the first integrator while the first integrator is frozen.

20 Claims, 8 Drawing Sheets

(51) Int. Cl.
*B64D 45/04* (2006.01)
*B64C 25/34* (2006.01)
*B64C 25/32* (2006.01)

(58) Field of Classification Search
CPC ......... B64C 25/00; B64C 19/00; B64D 45/04;
G05D 1/102; G05D 1/0858; G05D
1/0676; G05D 1/0653; G05D 1/101;
G05D 1/0808
See application file for complete search history.

(56) References Cited

FOREIGN PATENT DOCUMENTS

EP 3208190 A1 8/2017
EP 2821301 A1 1/2018

\* cited by examiner

SYSTEM AND METHOD FOR ROTORCRAFT-WEIGHT-ON-WHEELS FLIGHT STATE TRANSITION CONTROL

This application claims priority to U.S. Provisional Application Ser. No. 62/591,634, filed on Nov. 28, 2017, titled "System and Method for Rotorcraft Weight-on-Wheels Flight State Transition Control," which application is hereby incorporated by reference in its entirety.

TECHNICAL FIELD

The present invention relates generally to a system and method for automated flight control in a rotorcraft, and, in particular embodiments, to a system and method for determining a weight on wheels state for a rotorcraft during a landing or takeoff process, and providing flight management functions accordingly.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

An embodiment rotorcraft includes a plurality of wheels, each wheel of the plurality of wheels configured to receive weight of the rotorcraft when in contact with a landing surface, a plurality of wheel sensors, each wheel sensor of the plurality of wheel sensors associated with a respective wheel and having circuitry configured to generate a wheel on ground (WOG) signal indicating that the respective wheel is in contact with the landing surface, and a flight control computer (FCC) in signal communication with the plurality of wheel sensors, the FCC operable to execute a first hold loop having a first integrator and providing first control augmentation of a flight system of the rotorcraft, the FCC further operable to freeze the first integrator according to a number of WOG signals received from the plurality of wheel sensors, the FCC further operable to generate a first control signal according to a first value provided by the first integrator while the first integrator is frozen.

An embodiment flight control computer (FCC) for a rotorcraft includes a processor and a non-transitory computer-readable storage medium storing a program to be executed by the processor. The program includes instructions for receiving one or more signals indicating a weight on wheels (WOW) count associated with a number wheels of the rotorcraft that bear weight of the rotorcraft, providing a first set of integrators in a first set of hold loops that generate first control augmentation signals for a flight system of the rotorcraft, providing a second set of integrators in a second set of hold loops that generate second control augmentation signals for the flight system, maintaining a WOW state machine having at least a single gear state and an in transit state, determining an active WOW state of the WOW state machine according to at least the WOW count, freezing the first set of integrators in response to determining that the single gear state is the active WOW state, where the first set of hold loops generate the first control augmentation signals according to first values provided by the first set of integrators when the first set of integrators are frozen, and freezing the second set of integrators in response to determining that the in transit state is the active WOW state, where the second set of hold loops generate the second control augmentation signals according to second values provided by the second set of integrators when the second set of integrators are frozen.

An embodiment method for controlling a rotorcraft includes maintaining a weight on wheels (WOW) state machine having at least a single gear state, an in transit state, and an on ground state, determining an active WOW state of the WOW state machine according to one or more signals indicating a WOW count associated with a number wheels of the rotorcraft that bear weight of the rotorcraft, wherein the determining the active WOW state comprises using the in transit state as a buffer for a transition between the single gear state and the on ground state, freezing a first set of integrators in a first set of hold loops operated by a flight control computer (FCC) in response to determining that the active WOW state is the single gear state, freezing a second set of integrators in a second set of hold loops operated by the FCC in response to determining that the active WOW state is the in transit state, unfreezing the first set of integrators and the second set of integrators when the active WOW state is the in flight state, and generating control signals according to values provided by the first set of integrators and the second set of integrators when the active WOW state is one of the single gear state, the in transit state, and the in flight state.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
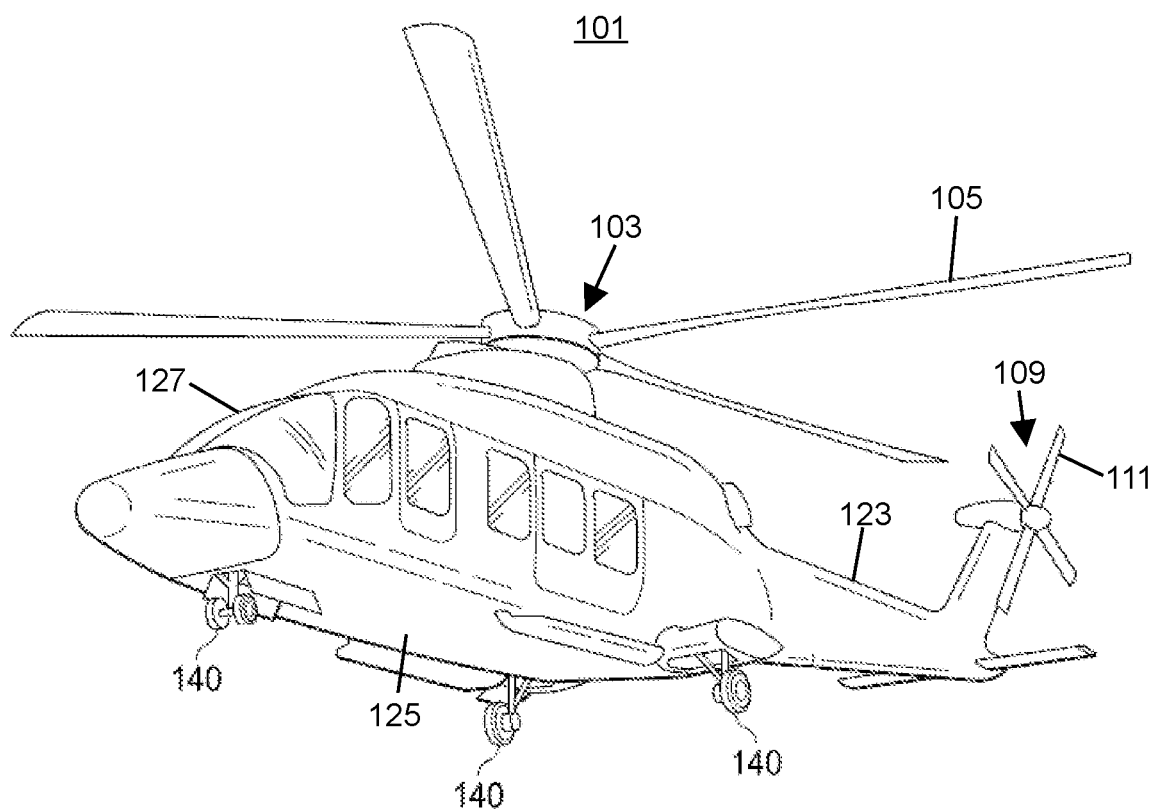
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

FBW systems for rotorcraft must provide stable flight characteristics for FBW controlled flight parameters while permitting the pilot to override or work with any suggested flight parameters suggested by the FBW system. Additionally, in providing enhanced control and automated functionality for rotorcraft flight, the FBW must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

Embodiments of the system and method described herein are directed to a system and method for determining the state of a rotorcraft's landing gear wheels during a landing or takeoff procedure. The FBW system may detect the number of wheels that are in contact with the ground, or that have weight on wheels (WOW) and provide hold loops with different augmentation for the flight system or different flight modes based on a state determined according to the WOW count and one or more flight conditions. In particular, embodiments of the FBW system use a four state system, with an in transit state providing a transition state where, to get out of the in transit state, the conditions must be maintained for a certain time period to avoid cycling between states. For example, when the rotorcraft is landing on an unstable surface, such as on the surface of a pitching ship or drilling platform, or when landing in gusty winds, the rotorcraft may detect a varying number of wheels that bear weight, since movement of the landing surface, or movement of the rotorcraft may cause bouncing, or rapid transitions between having no wheels on ground, one wheel on ground, or two or more wheels on ground. Holding the rotorcraft in the in transit state for a predetermined time ensures that the outer loop hold loops are not completely shut down until the rotorcraft can ensure that the landing state is stabilized.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate (not shown) in order to selectively control the attitude, altitude and movement of the rotorcraft 101. The swashplate may be used to collectively and/or cyclically change the pitch of the main rotor blades 105. The rotorcraft 101 also has an anti-torque system, which may include a tail rotor 109, no-tail-rotor (NOTAR), or dual main rotor system.

In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators (not shown). In some embodiments, the FBW system sends electrical signals to the tail rotor actuators or main rotor actuators to control flight of the rotorcraft 101.

Power is supplied to the main rotor system 103 and the anti-torque system by engines (not shown). There may be one or more engines, which may be controlled according to signals from the FBW system. The output of the engine is provided to a driveshaft, which is mechanically and operatively coupled to the rotor system 103 and the anti-torque system through a main rotor transmission and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

In some embodiments, the rotorcraft 101 may also have one or more wheels 140 that are used as landing gear. The rotorcraft 101 may have wheel sensors that provide signals to the FBW system indicating one or more of the wheels are in contact with a surface. For example, the wheels 140 may be mounted on hydraulic or pneumatic shock absorbers or struts, and wheel sensors may be disposed in the shock absorbers or struts and may have circuitry that monitors the pressure of the hydraulic or pneumatic medium to determine, based on the pressure of the system, whether the wheels 140 are depressed or have weight on them. In another example, a wheel sensors may each have circuitry that measures a displacement of a wheel 140 or connected element to determine, based on movement of the wheel 140, wheel assembly, support or the like, that the wheel 140 has weight applied to it or that a wheel 140 is in contact with the ground. Thus, the FBW system may determine the landing state of the rotorcraft 101 based on the number of wheels 140 in contact with the ground, and provide different flight augmentation features depending on the landing state. Additionally, while three sets of wheels 140 are shown in the illustrated embodiment, the embodiments are not limited to such as configuration, as more or fewer sets of wheels may be contemplated without deviating from the presented principles.

Figure 2:
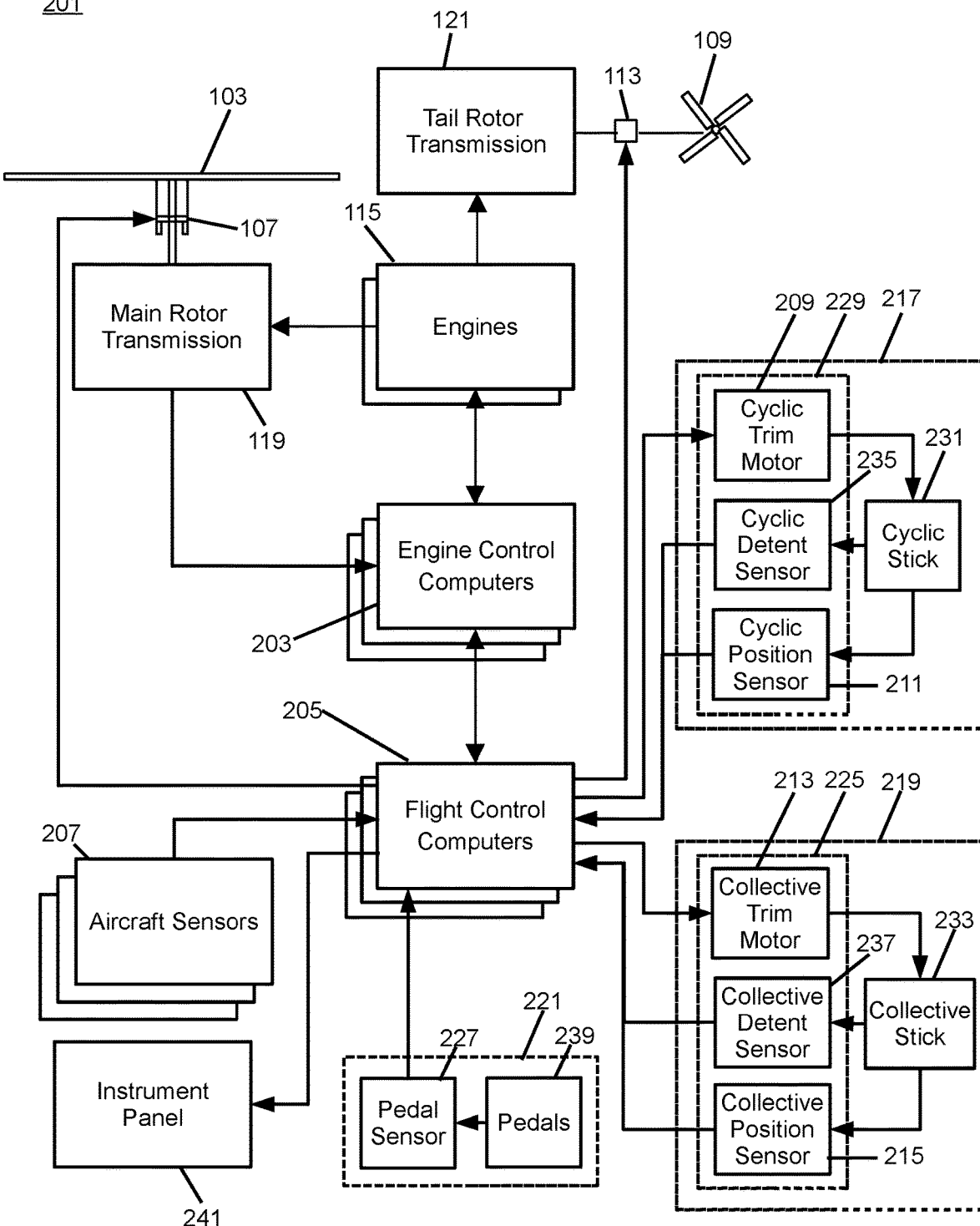
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions, and the like. For example, the aircraft sensors 207 may include sensors for determining which, if any, wheels are in contact with the ground, or measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like, and provide feedback signals indicative of such to the FCCs 205. When the FCCs 205 detect that a pilot has control of, or is manipulating, a particular control, the FCCs 205 may determine that stick to be OOD. Likewise, the FCCs may determine that the stick is ID when the signals from the detent sensors indicate to the FCCs 205 that the pilot has released a particular stick. The FCCs 205 may provide different default control or automated commands to one or more flight systems based on the detent status of a particular stick or pilot control.

Figure 3:
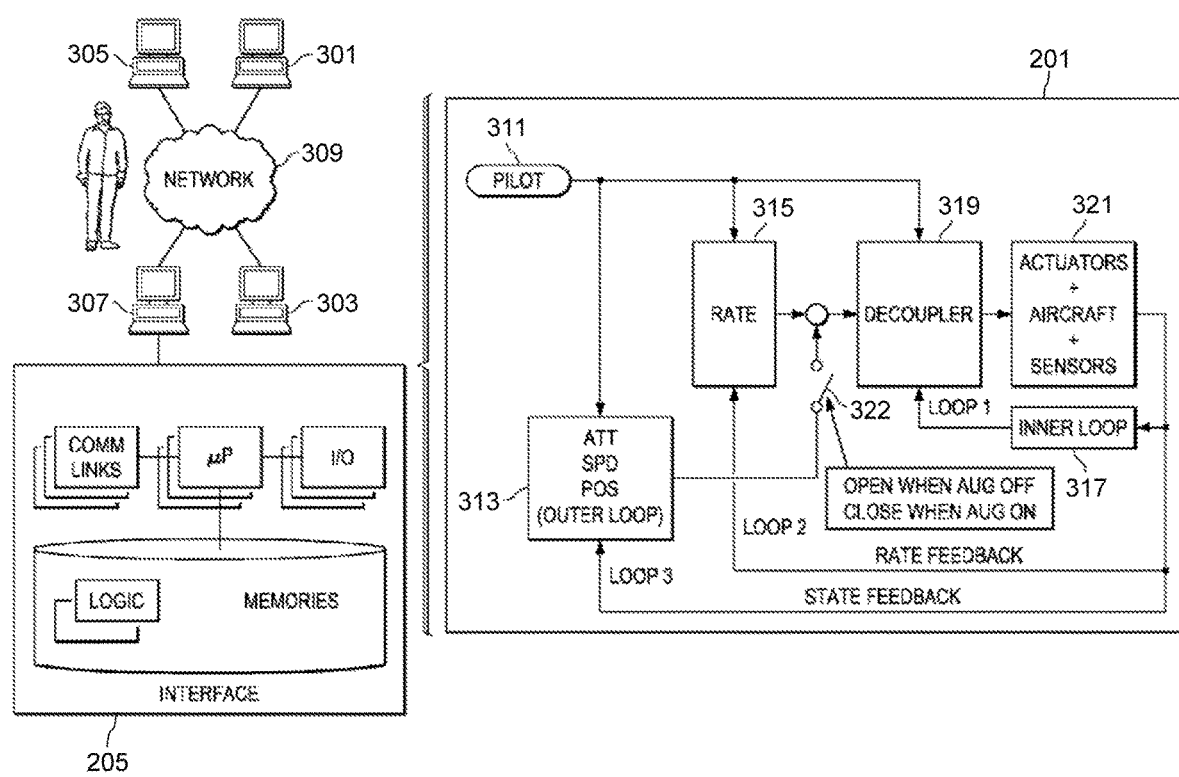
FIG. 3 representatively illustrates a three-loop flight control system 201 according to some embodiments.

Moving now to the operational aspects of flight control system 201, FIG. 3 illustrates in a highly schematic fashion, a manner in which flight control system 210 may implement FBW functions as a series of inter-related feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop or rate loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop 317 and rate loop 315 may stay active, independent of various outer loop hold loop modes. Outer loop 313 may include cascaded layers of loops, including an attitude loop, a speed loop, a position loop, a vertical speed loop, an altitude loop, and a heading loop. In accordance with some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The FCCs may modify, freeze, hold, turn off, or otherwise manage one or more hold loops depending on a weight on wheels state in a landing or takeoff process being performed by the rotorcraft. For example, the FCCs may change the response of one or more loops during a landing sequence. The FFCs may monitor the state of wheels, skids, or other landing gear or related sensors or devices to determine when the rotorcraft is engaging in a landing sequence, and may use hold loops in the outer loop 313 to modify pilot inputs or other control signals. In some embodiments, the FCCs may use a state machine with four landing states, such as an in flight state, a single gear state, an in transit state and an on ground state. The FCCs may use the state machine as a WOW state machine to determine when the rotorcraft is in flight, has weight on a single wheel, is in transit between being on the ground and having weight on a single gear, or is on the ground, and may set the landing state accordingly. The FCCs may turn off one or more hold loops, freeze one or more hold loops or pats of a hold loops, or operate one or more of the hold loops normally based on the landing state. For example, the FCCs may turn off all outer loop hold loops when the rotorcraft is on the ground, and operate all of the outer loop hold loops normally while the rotorcraft is in flight. The FCCs may also freeze integrators in, for example, a position hold loop, a speed hold loop, and a heading hold loop when the rotorcraft is in a single gear state, and may freeze integrators in, for example, the position hold loop, the speed hold loop, the heading hold loop, and one or more attitude hold loops when the rotorcraft is in the in transit state.

In some embodiments, the hold loops may have logical paths that provide output signals based on proportional calculation, for example, of the pilot inputs, and integrator paths that provide for feedback or other control adjustment using the integrators. Freezing the integrators permits the hold loops to freeze or turn off the integrator paths separately from the proportional paths. Thus, control signals or augmentation based on the proportional path may be maintained while the feedback inputs from the integrators are frozen or held. In these embodiments, the proportional paths may be active in the single gear state or in transit state while the integrators and integrator paths are frozen.

The FCCs may use integrators as part of a feedback system. In some embodiments, each outer loop may have an integrator that integrates an error determined from feedback from the flight control system and rotorcraft sensors. Freezing integrators in, for example, the single gear state and in transit state allows the FCCs to freeze the integrators with an output value that is close to, or indicative of, the flight condition that the rotorcraft was most recently experiencing. Freezing the integrators prevents the integrators from "winding up", to prevent erroneous inputs. Freezing the integrators instead of completely shutting off the integrators also prevents the need to reinitialize the integrators after completely shutting off the integrators, where the integrators buffer inputs before generating useful data. Thus, freezing the integrators so that they hold the most recent output value permits the use of relatively current feedback data without lag associated with restarting the integrator from scratch. Additionally, freezing different sets of integrators in different states permits the outer loops hold systems to be shut down gradually instead of all at once. This allows for situations where, if a sensor is stuck, or flight conditions cause the weight on wheels state to change rapidly, the outer loops aren't completely turned off, and can be turned on without requiring reinitialization.

Figure 4:
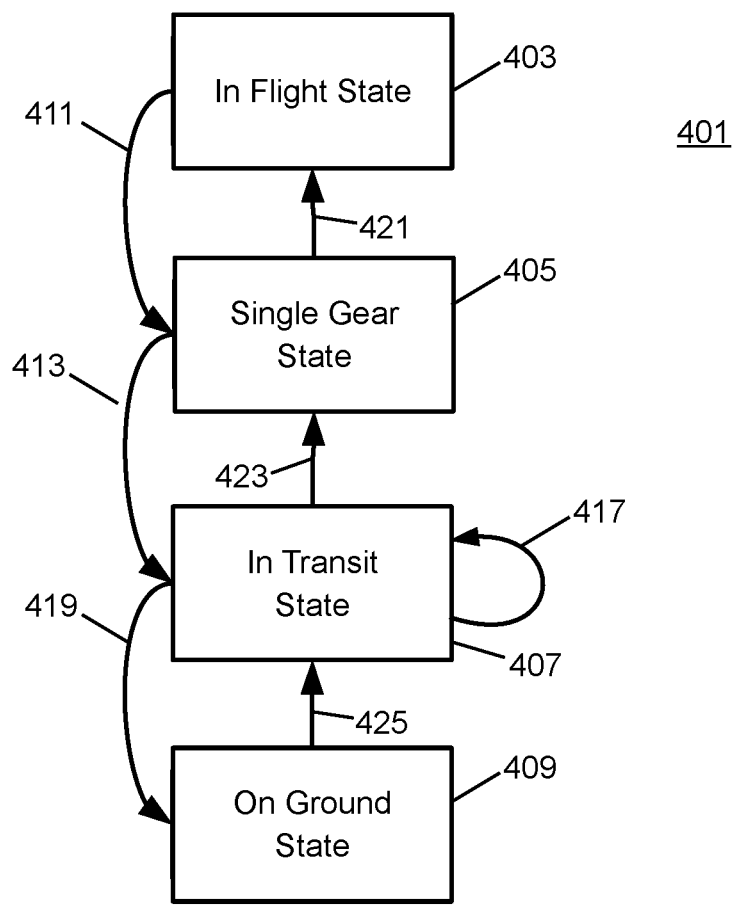
FIG. 4 is a state diagram illustrating a weight on wheels state machine for controlling a rotorcraft according to signals indicating a number of wheels on ground according to some embodiments.

FIG. 4 is a state diagram illustrating a weight on wheels (WOW) state machine 401 for controlling a rotorcraft according to signals indicating a number of wheels on the ground according to some embodiments. The WOW state machine 401 may be software running on one or more of the FCCs, and may be used by the FCCs to determine the state for a landing or takeoff process being performed by a rotorcraft. The FCCs may track which WOW state is an active WOW state, and apply a flight management function based on the active WOW state. In some embodiments, the FCCs may determine which WOW state is the active WOW state for the rotorcraft based on signals indicating the number of wheels that are contacting the ground or that are bearing weight, a current or previous WOW state, airspeed, flight mode selection, pilot control inputs, pilot inputs to the FBW system, and the like.

In some embodiments, the WOW state machine 401 has four states, including an in flight state 403, a single gear state 405, an in transit state 407 and an on ground state 409. The FCCs track the active WOW state of the WOW state machine 401 by determining whether the conditions for transitioning from a first or previous WOW state to a second, or new, WOW state are met. The FCCs may change the active WOW state by implementing a transition between states, which may, in some embodiments, include setting a variable or otherwise storing a value to indicate the active WOW state.

Additionally, each of the WOW states 403, 405, 407 and 409 may have an associated hold loop state. In some embodiments, the in flight state 403 represents the rotorcraft being in flight, with no wheels on the ground or with weight on no wheels. The in flight state 403 may also have a hold loop state where all of the hold loops are operating normally, with the integrators in the respective hold loops actively monitoring feedback or error and providing outer loop feedback based on live data.

The single gear state 405 represents the rotorcraft being between being fully in flight and fully on the ground. In some embodiments, the single gear state 405 is achieved when the FCCs detect that a single wheel is on the ground, for example, by receiving a single wheel on ground (WOG) signal, and that the airspeed is at or above a predetermined landing speed threshold. Additionally, the single gear state 405 may be achieved when the FCCs detect that a single wheel is on the ground, and that the previous WOW state was, or is transitioning from, the in flight state 403. The single gear state 405 may also be achieved when the FCCs detect that that the rotorcraft has had a single wheel on the ground for longer than a single WOG threshold and the previous WOW state was, or is transitioning from, the in transit state 407. The single gear state 405 may also have a hold loop state where a first set of hold loop integrators are frozen. In some embodiments, the first set of hold loop integrators includes integrators for a position hold, a speed hold and a heading hold. The frozen integrators may hold a last value that was calculated before the respective integrator, and may provide outer loop feedback based on held data, or data received by the integrator prior to being frozen.

The in transit state 407 represents the rotorcraft being in a transition between in flight and fully on the ground, and in some embodiments, represents the rotorcraft being in transition between being fully on the ground and being in the single gear state 405. In some embodiments, the in transit state 407 is achieved when the FCCs detect that a single wheel is on the ground, for example, by receiving a single WOG signal, and that the airspeed is below the predetermined landing speed threshold. In some embodiments, the in transit state 407 is also achieved when the active WOG state was previously the in transit state and the FCCs determine that a single wheel is on the ground for less than the single WOG threshold. This effective leaves the in transit state as the active state until the single WOG signal is held for a particular time. Additionally, the in transit state 407 may be achieved when the FCCs detect that two or more wheels are on the ground, for example, by receiving a two or more WOG signals or a signal indicating that two or more wheels are on the ground less than a two WOG threshold.

The in transit state 407 may have a hold loop state where a second set of hold loop integrators are frozen. In some embodiments, the second set of hold loop integrators may be different than, or include the first set of hold loop integrators. For example, where the first set of hold loop integrators include integrators for a position hold, a speed hold and a heading hold, the second set of hold loop integrators may include one or more attitude hold integrators in addition to integrators for the position hold, speed hold and heading hold. In some embodiments, the attitude hold loops may include one or more separate hold loops for pitch attitude, roll attitude and yaw attitude, and each attitude hold loop may be handled separately or the integrators for each attitude hold loop is frozen separately. Thus, as the rotorcraft transitions between the on ground state and the single gear state, more integrators are frozen than in the single gear state, but the hold loops having the integrators are not shut down completely, as in the on ground state.

The on ground state 409 represents the rotorcraft being on the ground, and in some embodiments, represents the rotorcraft having settled onto to or more wheels. In some embodiments, the on ground state 409 is achieved when the FCCs detect that two or more wheels are on the ground, for example, by receiving a two or more WOG signals or a signal indicating that two or more wheels are on the ground for longer than the two WOG threshold. The on ground state 407 may also have a hold loop state where one or more of the hold loops or integrators are turned off. In some embodiments, the hold loops for position hold, speed hold, heading hold and attitude hold may be turned off when the rotorcraft is in the on ground state so that the hold loops do not provide any control augmentation. In other embodiments, the integrators for the position hold loop, speed hold loop, heading hold loop and attitude hold loop may be tuned off so that the integrator paths of the respective hold loop does not provide any feedback signal for modifying the proportional path signal, resulting in an output control signal generated according to control input but without augmentation or feedback data.

In some embodiments, the active WOW state may initially be set to the on ground state 409, or to another default WOW state. For example, when the FCCs are booted up or restarted, the FCCs may initially set the active WOW state to the on ground state 409, and then attempt to determine a new active WOW state.

The FCCs continuously monitor the disposition of the rotorcraft wheels to determine how many wheels are contacting the ground or have weight on them. When the active WOW state is the on ground state 409, the FCCs may change the active WOW state by transition 425 to the in transit state 407 when the number of wheels on the ground is less than two.

When the active WOW state is the in transit state 407, the FCCs may change the active WOW state, through transition 419, to the on ground state 409 when the number of wheels on the ground is two or greater for more than the two WOG timer threshold, and to the single gear state 405, through transition 423, when the number of wheels on the ground is less than two for longer than the one WOG timer threshold, but not when the number of wheels on the ground is one and the airspeed of the rotorcraft is less than the landing speed threshold. When the active WOW state is the in transit state 407, and the FCCs determine that the operation parameters of the rotorcraft do not satisfy the conditions for transitioning out of the in transit state 407, the FCCs may maintain the in transit state 407 as the active WOW state and may increment a timer or counter through a loop transition 417.

When the active WOW state is the single gear state 405, the FCCs may change the active WOW state, through transition 413, to the in transit state 407 when the number of wheels on the ground is two or greater, or when the number of wheels on the ground is one and the airspeed of the rotorcraft is less than the landing speed threshold. Additionally, when the active WOW state is the single gear state 405, the FCCs may change the active WOW state, through transition 421, to the in flight state 403 when the number of wheels on the ground is zero.

When the active WOW state is the in flight state 403, the FCCs may change the active WOW state, through transition 411, to the single gear state 405 when the number of wheels on the ground is one or greater.

The transitions between different states may be chained so that the FCCs may change the state through multiple states in a single process. For example, when a rotorcraft is in the in flight state 403, the rotorcraft may touch down with two or more wheels simultaneously. The FCCs change the active WOW state to the single gear state 405 through transition 411 since the number of wheels on the ground is greater than 1, and then change the active WOW state to the in transit state 407 through transition 413 since the number of wheels on the ground is equal to or greater than two.

Figure 5:
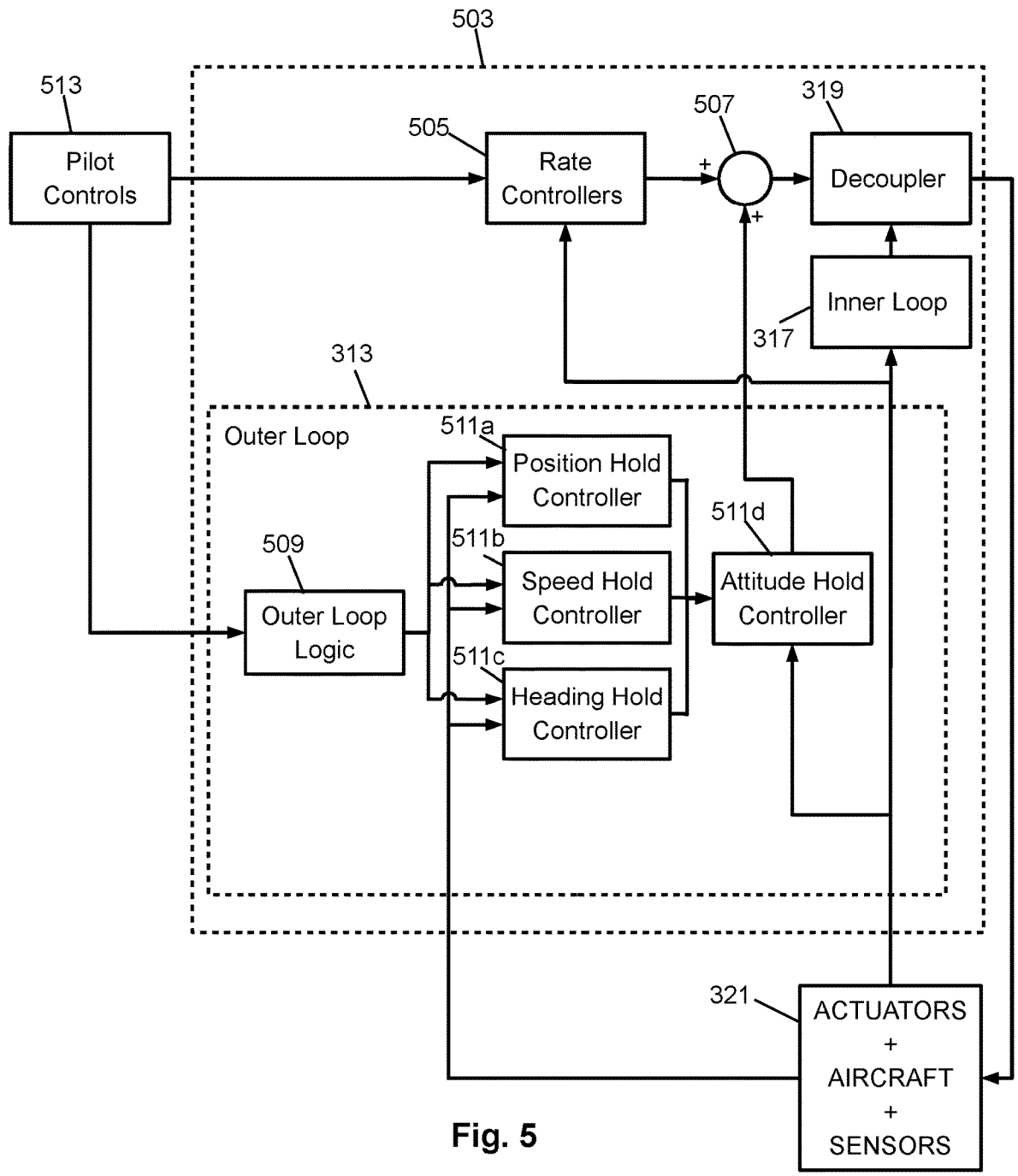
FIG. 5 is a diagram illustrating a system for controlling a rotorcraft using flight hold element according to some embodiments.

FIG. 5 is a diagram illustrating a system 501 for controlling a rotorcraft using flight hold elements according to some embodiments. Pilot controls 513 are, for example, control elements such as a collective stick and cyclic stick that generate the respective pitch and roll commands. As shown, pilot controls 513 interface to flight controller 503. In various embodiments, flight controller 503 is implemented using the FCCs or other processing hardware. Flight controller 503 also interfaces with and controls aircraft equipment 321 representing various actuators, sensors, and the physical body of the rotorcraft. In various embodiments, flight controller 503 controls aircraft equipment 321 using three loops, for example, the inner loop 317, a rate feedback loop (See FIG. 2) and a state feedback loop (See FIG. 2). The inner loop 317 stabilizes the dynamics of the rotorcraft, the rate loop controls the angular rates of the rotorcraft, and the outer loop 313 provides control signals to the inner loop 317 and/or rate loops to achieve a desired attitude, speed and position of the rotorcraft. In some embodiments, the outer loop 313 supports and provides flight augmentation or auto-pilot functionality and may be manually or automatically disabled based on flight and system conditions. The inner loop 317 and rate feedback loops, on the other hand, remain operational to provide stability to the rotorcraft.

For purposes of illustration, the flight controller 503 is depicted with elements that control various holds provided by the outer loop 313. It should be understood that the flight controller 503 may also include other controllers and control paths that affect rate loops and state feedback systems. The inner loop 317 is controlled or implemented by an inner loop controller, the rate loop is implemented by one or more rate controllers 505 that may include, for example, a pitch rate controller and a roll rate controller. The outer loop 313 is controlled by outer loop logic 509 implemented in conjunction with one or more outer loop hold loop controllers 511 such as a position hold controller 511*a*, speed hold controller 511*b*, heading hold controller 511*c* and attitude hold controller 511*d*.

The inner loop 317 receives sensor feedback from sensors 321 such as gyroscopes and accelerometers within the rotorcraft and provides control signals to various actuators 321, such as swashplate to stabilize the rotorcraft. The rate controllers 505 receive rate feedback for one or more axes from sensors 321 such as rate gyroscopes, and, in some modes of operation, provide a rate command signal based on the rate feedback and the position of the pilot controls 513. Decoupler 319 receives the various rate commands and decouples all 4-axes (pitch, roll, yaw, and vertical) such that, for example, a forward longitudinal stick input does not require the pilot to push the stick diagonally. The outer loop 313 also receives state or rate feedback from the aircraft sensors 321. In some embodiments, one or more of the hold loop controllers 511 receive feedback data from the sensors 321 and control data from the outer loop logic 509 that is generated according to position signals from the pilot controls 513. This feedback may include, for example, speed, position and attitude, and the control data may include signals indicating control inputs made by the pilot and that are adjusted or augmented by the outer loop logic 509.

The hold loop controllers 511 generate hold commands that incorporate or use commands from the inner loop 317, essentially wrapping the inner loop 317 in higher level functionality. The hold loop controllers 511 may generate loop hold commands to execute one or more specific holds based on the feedback data and the control data. In some embodiments, one or more of the hold loop controllers 511 may act independently, and in other embodiments, one or more of the hold loop controllers 511 may act in concert with another outer loop hold loop controller 511. For example, the position hold controller 511*a* may receive feedback including position data from the sensors 321, and may use the feedback data, along with any control data, to generate position hold commands to maintain a position of the rotorcraft. The position data may indicate an absolute position of the rotorcraft that the FCCs use to determine drift or deviation from a target position, a position delta indicating the displacement from the target position, movement data used to determine a rate of movement from the target position, or the like. The position hold controller 511*a* may use the position data to determine flight commands to correct for any deviation from the target position. Additionally, the position hold controller 511*a* may also use any control data received from the pilot controls 513 or outer loop logic 509 indicating that the pilot or outer loops is intentionally or manually moving the rotorcraft, or otherwise changing the target position. Similarly, the speed hold controller 511*b*, heading hold controller 511*c* and attitude controller may use relevant rotorcraft flight feedback or control data to generate commands associated with the particular controller's hold function.

Figure 6:
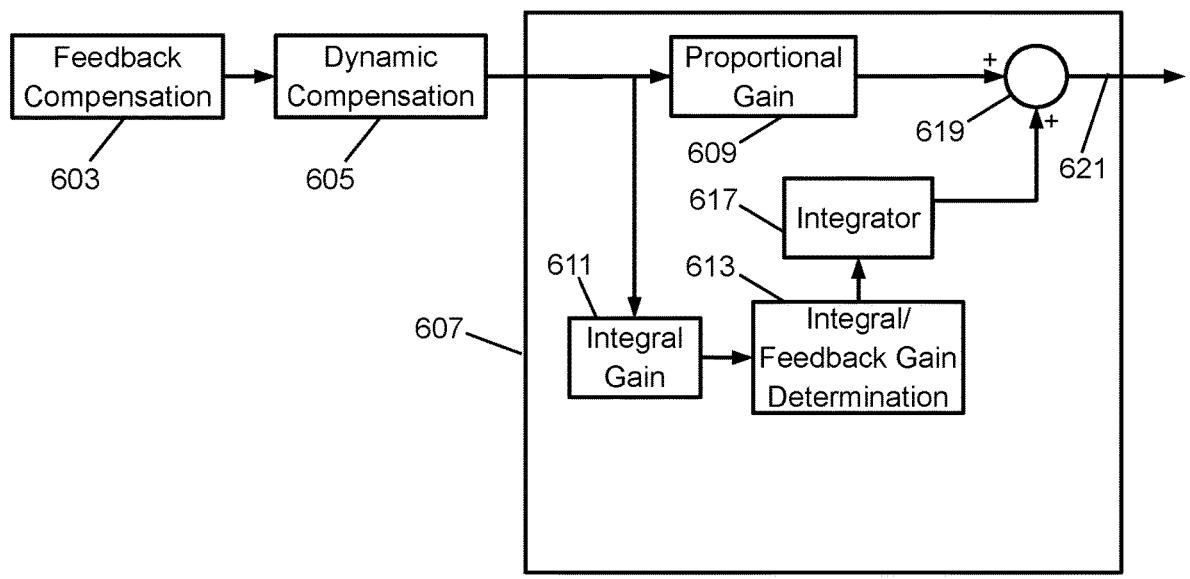
FIG. 6 is a diagram illustrating a flight hold element with an integrator according to some embodiments.

FIG. 6 is a diagram illustrating an outer loop hold loop controller 511 with an integrator 617 according to some embodiments, and that may be used as the loop hold controllers illustrated in FIG. 5. As shown, outer loop hold loop controller 511 includes a feedback compensation block 603, a dynamic compensation block 605 and proportional-integral (PI) controller 607. The feedback compensation block 603 produces an error signal based on the command produced by the outer loop logic 509 (FIG. 4) and the dynamic compensation block 605 compensates for the dynamics of the rotorcraft in order to improve stability and/or adjust the time response of the particular hold loop. The dynamic compensation block 605 may include various control blocks such as, but not limited to, a PID controller, a lead-lag compensator, and the like.

PI controller 607 includes a proportional signal path that includes proportional gain block 609 coupled in parallel with an integral signal path that includes an integral gain block 611 and an integrator 617. In various embodiments, the proportional gain block 609 and integral gain block 611 provide gains for the proportional paths and integral paths, respectively, so that the effect of each may be individually adjusted. The proportional gain block 609 and integral gain block 611 may be implemented, for example, by performing a multiplication or scaling operation. The integrator 617 may be implemented, for example, using an accumulator. In some embodiments, an actuator command or control signal 621 is generated by summer 619 by summing the signal generated by the proportional and integral paths.

The FCCs of the rotorcraft may be configured to freeze the integrator 617 so that the integrator 617 holds the most recent output value until the integrator is unfrozen or the outer loop hold loop controller 511 is disabled or turned off. The FCCs may, in some embodiments, freeze the integrator 617 by causing the integrator to ignore new incoming data so that the integrator 617 holds all of the values received prior to being frozen. For example, where the integrator 617 is an accumulator, the integrator 617 may discard new values so that the accumulated result remains the same. In another embodiment, the integrator 617 may store the value of the integrator 617 calculation at the time the integrator 617 is frozen, and the output is, or is generated according to, the stored value while the integrator 617 is frozen. Thus, the integrator 617 may continue to calculate a new integrated value, but will not output the new value since the stored integrator calculation value is output instead. Freezing the integrator 617 permits the summer 619 to maintain a substantially consistent output value since the frozen integrator 617 does not change values while the integrator 617 is frozen. Additionally, the summer 619 may generate the actuator command or control signal 621 using the proportional path, or signals received from the proportional gain block 609 that change to reflect, for example, pilot inputs, while the integrator path, or signal from the integrator 617 remains constant. Thus, the hold loop provided by the outer loop hold loop controller 511 is partially shut down since the value from the integrator 617 is maintained while the integrator 617 is frozen, but is not completely eliminated. In other embodiments, the integrator 617 may be turned off so that it does not provide a value. Thus, the actuator command or control signal 621 may be generated from the signal from the proportional gain block 609 in the proportional signal path without any data from the integrator 617 in the integrator path.

Figure 7:
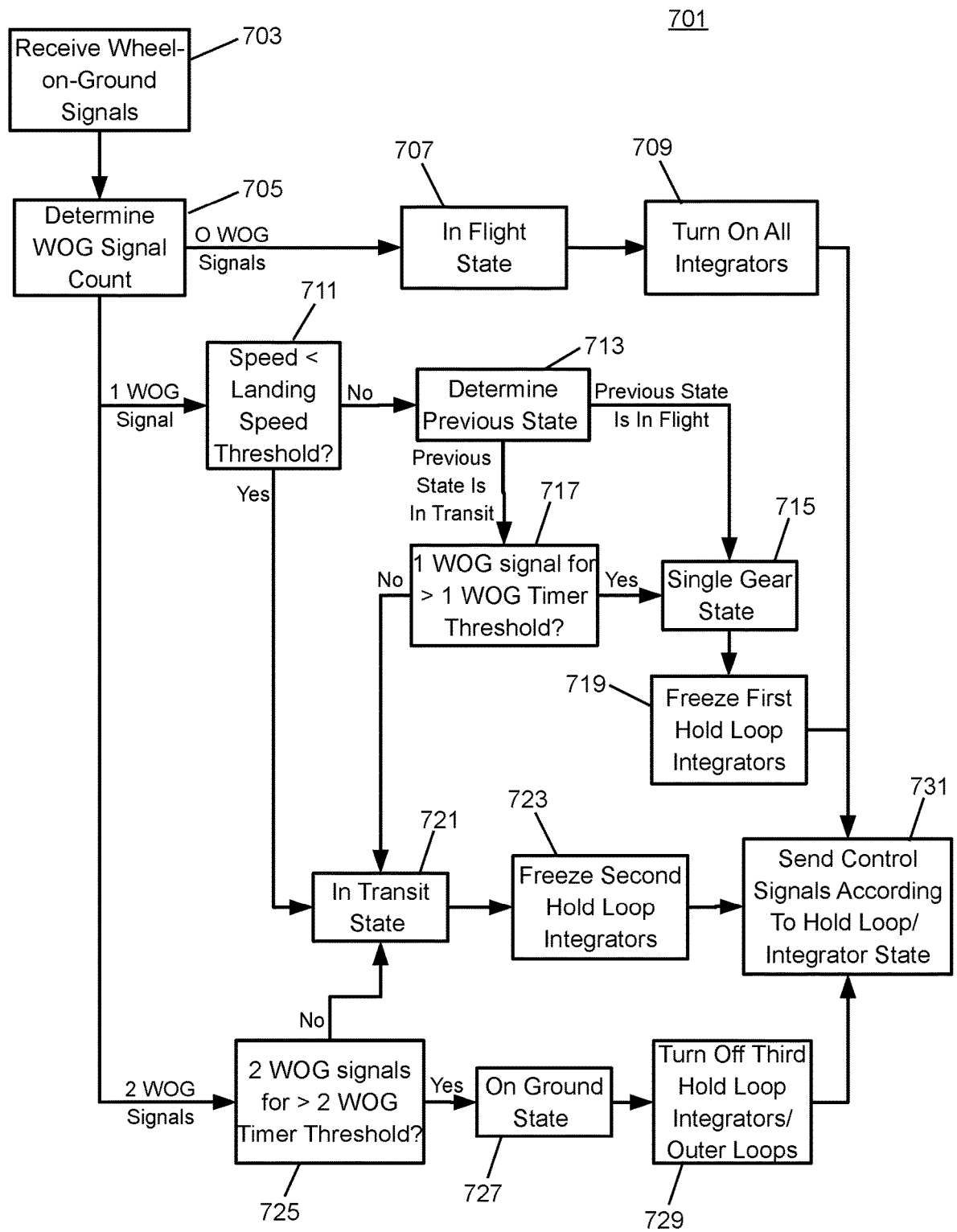
FIG. 7 is a flow diagram illustrating a method for determining a weight on wheels state using to weight on wheels signals according to some embodiments.

FIG. 7 is a flow diagram illustrating a method 701 for determining a weight on wheels state using to weight on wheels signals according to some embodiments. In block 703, the FCCs receive WOG signals. In some embodiments, the FCCs receive signals indicating whether each wheel is on the ground, and the number of wheels indicated as being on the ground is the number of WOG signals or a WOW count. In other embodiments, the FCCs may receive positive signals indicating the number of wheels on the ground, with wheels that are not in the ground being indicated by a negative signal or a lack of a signal. Thus, the FCCs are able to determine that no WOG signals are received by not receiving any positive WOG signals. In yet another embodiment, the FCCs may receive a signal, frame, packets, or other data element sent over, for example, a bus, with the data element having data indicating the number of wheels on the ground, number of wheels bearing weight, or WOW count.

In block 705, the FCCs determine the number of WOG signals or WOW count from the signals or data indicating the WOG signals or WOW count. The FCCs may use the number of WOG signals or WOW count to determine the number of wheels on the ground or that are bearing weight.

If the FCCs determine that zero wheels are on the ground, or that zero WOG signals have been received, then the FCCs set the active WOW state, in block 707, to the in flight state. When the active WOW state is changed to the in flight state, in block 709, the FCCs run hold loops normally, and turn on or run integrators in a first and second set of loop hold controllers normally. In instances where the integrators were previously shut off or frozen, the FCCs may restart or unfreeze the integrators for normal operation. Thus, turning on all integrators may include turning on, unfreezing, or otherwise verifying that each integrator from the first and second set of loop hold controllers is operating normally.

When the FCCs determine that a single wheel is on the ground by, for example, detecting that one WOG signal is active, the FCCs, in block 711, determine whether the speed of the rotorcraft is greater than a landing speed threshold. In some embodiments, the landing speed threshold may be 35 knots. If the rotorcraft speed is greater than, or equal to, the landing speed threshold, then the FCCs determine the previous WOW state in block 713. If the previous WOW state was the in flight state, then, in block 715, the FCCs set the active WOW state to the single gear state, and subsequently freeze first hold loop integrators in block 719. If the previous WOW state was the in transit state, the FCCS determine, in block 717, whether the one WOG signal has been active, constant, received, or held for longer than the one WOG timer threshold. In some embodiments, the one WOG timer threshold is two seconds. If the one WOG signal has been active for longer than the one WOG timer threshold, then, in block 715, the FCCs set the active WOW state to the single gear state, and subsequently freeze the first hold loop integrators in block 719. If the one WOG signal has been active for a time equal to, or less than, the one WOG timer threshold, then, in block 721, the FCCs set the active WOW state to the in transit state, and subsequently freeze the second hold loop integrators in block 723. Thus, in some embodiments, if the rotorcraft has a single wheel on the ground and speed is greater than the landing speed threshold, the FCCs determine that the active WOW state is the single gear state if the previous state was the in flight state if the FCCs also detect that the one wheel on the ground for more than two seconds. If the FCCs determine, in block 711, that the rotorcraft speed is less than the landing speed threshold, then the FCCs set the active WOW state, in block 721, to the in transit state, and subsequently freeze the second hold loop integrators in block 723.

When the FCCs determine, in block 705, that two or more wheels are on the ground by, for example, detecting that two WOG signals are active, the FCCs, in block 725, determine whether the two WOG signals has been active, constant, received, or held for longer than the two WOG timer threshold. In some embodiments, the two WOG timer threshold is two seconds, and may be the same as, or different from, the one WOG threshold. If the two WOG signals have been active for a time equal to, or less than, the two WOG timer threshold, then, in block 721, the FCCs set the active WOW state to the in transit state, and subsequently freeze the second hold loop integrators in block 723. If the two WOG signal has been active for longer than the two WOG timer threshold, then, in block 727, the FCCs set the active WOW state to the on ground state, and subsequently turn off a third set of integrators or outer loops in block 729. In some embodiments, the third hold loop integrators are a set that includes all of the first hold loop integrators and the second hold loop integrators. Turning off the third integrators may include stopping the integrators from providing a data signal along the integral path instead of freezing the integrators with the most recent calculated data value. In another embodiment, the FCCs may turn off hold loops that include the third integrators. Turning off the hold loops may include ceasing data transmission through, stopping, blocking or ignoring data transmitted through both the proportional path and the integral path of a particular hold loop.

After the integrators or hold loops are set by freezing or unfreezing the integrators or turning on or turning off the hold loops in blocks 709, 719, 723 or 729, the FCCs send control signals according to the respective hold loop/integrator state in block 731. For example, when an integrator is frozen, the FCCs may generate and send, to an actuator or control device, an actuator command or control signal that includes a signal from the proportional path and a signal from one of an active integrator or a frozen integrator, depending on the state of the integrator. In another embodiments, the actuator command or control signal includes a signal generated without hold loop augmentation when the hold loop itself is turned off, or includes a signal from the proportional path from the hold lop without a signal from the integral path when, for example, the integrator is turned off.

The foregoing illustrates a method where the in transit state is between the single gear state and the on ground state, and may be used as a buffer in a landing process by buffering the transition between the on ground state and the single gear state. The use of the one WOG timer threshold and the two WOG timer threshold causes the rotorcraft to maintain the in transit state as the active WOW state for a time that is at least as long as the one or two WOG thresholds, allowing for a buffer period where the second hold loop integrators are frozen for a predetermined time period without the respective hold loops being fully turned off. In some embodiments, the first hold loop integrators include integrators for the position hold loop, the speed hold loop, and the heading hold loop, while the second hold loop integrators include integrators for the position hold loop, the speed hold loop, the heading hold loop, and one or more attitude hold loops. Thus, in some embodiments, the first hold loop integrators may be a set of integrators that is different from the second set of hold loop controllers, but may have one or more hold loop integrators that is common in the set of first hold loop controller integrators and the second set of hold loop controller integrators.

It should be understood that the method 701 described above may be repeated continuously so that the state of the wheels is monitored, and the active WOW state is continuously set to reflect the state of the wheels on the ground. Thus, the different sets of integrators may be turned on and off or frozen and unfrozen as the state of the wheels changes.

Figure 8:
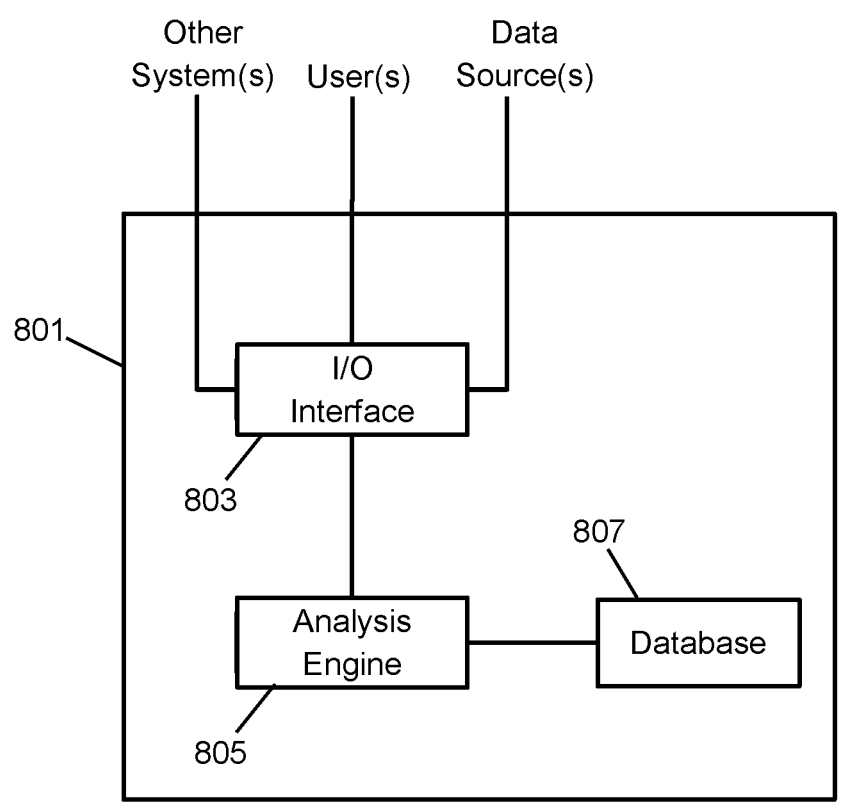
FIG. 8 illustrates an embodiment computer system.

FIG. 8 illustrates a computer system 801. The computer system 801 can be configured for performing one or more functions with regard to the operation of the flight control system 201 and the method 500, as described herein. Further, any processing and analysis can be partly or fully performed by the computer system 801. The computer system 801 can be partly or fully integrated with other aircraft computer systems or can be partly or fully removed from the rotorcraft. In some embodiments, the computer system 801 may be implements as an FCC, and may monitor the state of the wheels, and may be configured to set the WOW state and freeze, turn off, turn on, or unfreeze one or more integrators in one or more hold loops.

The computer system 801 can include an input/output (I/O) interface 803, an analysis engine 805, and a database 807. Alternative embodiments can combine or distribute the I/O interface 803, the analysis engine 805, and the database 807, as desired. Embodiments of the computer system 801 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 803 can provide a communication link between external users, systems, and data sources and components of the computer system 801. The I/O interface 803 can be configured for allowing one or more users to input information to the computer system 801 via any known input device. Examples can include a keyboard, mouse, touch screen, and/or any other desired input device. The I/O interface 803 can be configured for allowing one or more users to receive information output from the computer system 801 via any known output device. Examples can include a display monitor, a printer, cockpit display, and/or any other desired output device. The I/O interface 803 can be configured for allowing other systems to communicate with the computer system 801. For example, the I/O interface 803 can allow one or more remote computer(s) to access information, input information, and/or remotely instruct the computer system 801 to perform one or more of the tasks described herein. The I/O interface 803 can be configured for allowing communication with one or more remote data sources. For example, the I/O interface 803 can allow one or more remote data source(s) to access information, input information, and/or remotely instruct the computer system 801 to perform one or more of the tasks described herein.

The database 807 provides persistent data storage for the computer system 801. Although the term "database" is primarily used, a memory or other suitable data storage arrangement may provide the functionality of the database 807. In alternative embodiments, the database 807 can be integral to or separate from the computer system 801 and can operate on one or more computers. The database 807 preferably provides non-volatile data storage for any information suitable to support the operation of the flight control system 201 and the method 500, including various types of data discussed further herein. The analysis engine 805 can include various combinations of one or more processors, memories, and software components.

An embodiment rotorcraft includes a plurality of wheels, each wheel of the plurality of wheels configured to receive weight of the rotorcraft when in contact with a landing surface, a plurality of wheel sensors, each wheel sensor of the plurality of wheel sensors associated with a respective wheel and having circuitry configured to generate a wheel on ground (WOG) signal indicating that the respective wheel is in contact with the landing surface, and a flight control computer (FCC) in signal communication with the plurality of wheel sensors, the FCC operable to execute a first hold loop having a first integrator and providing first control augmentation of a flight system of the rotorcraft, the FCC further operable to freeze the first integrator according to a number of WOG signals received from the plurality of wheel sensors, the FCC further operable to generate a first control signal according to a first value provided by the first integrator while the first integrator is frozen.

In some embodiments, the FCC is further operable to monitor an active weight on wheels (WOW) state by setting the active WOW state to a state in a WOW state machine, wherein the WOW state machine has an in transit state, and wherein the FCC is further operable to freeze the first integrator when the active WOW state is the in transit state. In some embodiments, the FCC is further operable to set the active WOW state to the in transit state in response to the FCC determining that the number of WOG signals is one or greater. In some embodiments, the FCC is further operable to set the active WOW state to the in transit state in response to the FCC determining that the number of WOG signals is one and further in response to a speed of the rotorcraft being less than a landing speed threshold. In some embodiments, the FCC is further operable to set the active WOW state to the in transit state in response to the FCC determining that the number of WOG signals is one, in response to a speed of the rotorcraft being greater than or equal to the landing speed threshold, in response to a previous WOW state of the rotorcraft being the in transit state, and further in response to the number of WOG signals being one for a period less than or equal to a one WOG timer threshold. In some embodiments, the WOW state machine further includes a single gear state and an in flight state, and the FCC is further operable to set the active WOW state to the single gear state in response to the FCC determining that the number of WOG signals is one, in response to the speed of the rotorcraft being greater than or equal to the landing speed threshold, and further in response to one of: a previous WOW state of the rotorcraft being the in flight state, or the previous WOW state of the rotorcraft being the in transit state and the number of WOG signals being one for a period greater than the one WOG timer threshold, and the FCC is further operable to execute a second hold loop having a second integrator and providing second control augmentation of the flight system, the FCC is further operable to unfreeze the first integrator and freeze the second integrator when the active WOW state is the single gear state, and the FCC is further operable to generate a second control signal according to a second value provided by the second integrator while the second integrator is frozen. In some embodiments, the first hold loop is a different hold loop than the second hold loop, and the FCC is further operable to set the active WOW state to the in flight state in response to the FCC determining that the number of WOG signals is zero, and wherein the FCC is further operable to unfreeze the first integrator and the second integrator when the active WOW state is the in flight state. In some embodiments, the WOW state machine further includes an on ground state, and the FCC is further operable to set the active WOW state to the on ground state in response to the FCC determining that the number of WOG signals is two for a period greater than a two WOG timer threshold, and the FCC is further operable to turn off the first integrator and the second integrator when the active WOW state is the on ground state, and the FCC is further operable to generate the first and second control signals according to values other than values provided by the first and second integrators while the first and second integrators are turned off. In some embodiments, the FCC is further operable to set the active WOW state to the in transit state in response to the FCC determining that the number of WOG signals is two for a period less than or equal to a two WOG timer threshold.

An embodiment flight control computer (FCC) for a rotorcraft includes a processor and a non-transitory computer-readable storage medium storing a program to be executed by the processor. The program includes instructions for receiving one or more signals indicating a weight on wheels (WOW) count associated with a number wheels of the rotorcraft that bear weight of the rotorcraft, providing a first set of integrators in a first set of hold loops that generate first control augmentation signals for a flight system of the rotorcraft, providing a second set of integrators in a second set of hold loops that generate second control augmentation signals for the flight system, maintaining a WOW state machine having at least a single gear state and an in transit state, determining an active WOW state of the WOW state machine according to at least the WOW count, freezing the first set of integrators in response to determining that the single gear state is the active WOW state, where the first set of hold loops generate the first control augmentation signals according to first values provided by the first set of integrators when the first set of integrators are frozen, and freezing the second set of integrators in response to determining that the in transit state is the active WOW state, where the second set of hold loops generate the second control augmentation signals according to second values provided by the second set of integrators when the second set of integrators are frozen.

In some embodiments, the program further include instructions for setting the active WOW state to the in transit state in response to the FCC determining that the WOW count is one and further in response to the FCC determining that a speed of the rotorcraft is less than a landing speed threshold, setting the active WOW state to the in transit state in response to the FCC determining that the WOW count has been one for a period less than or equal to a one WOG timer threshold, in response to the FCC determining that the speed of the rotorcraft is greater than or equal to the landing speed threshold, and further in response to a previous WOW state of the rotorcraft is the in transit state, and setting the active WOW state to the in transit state in response to the FCC determining that the WOW count has been two for a period less than or equal to a two WOG timer threshold. In some embodiments, the WOW state machine further has an in flight state and an on ground state, and the program further includes instructions for setting the active WOW state to the single gear state in response to the FCC determining that the WOW count is one and that the speed of the rotorcraft is greater than or equal to the landing speed threshold, and further in response to one of: a previous WOW state of the rotorcraft being the in flight state, or the previous WOW state of the rotorcraft being the in transit state and the WOW count having been one for a period greater than the one WOG timer threshold, setting the active WOW state to the in flight state in response to the FCC determining that the WOW count is zero, and wherein the FCC is further operable to unfreeze the first set of integrators and the second set of integrators when the active WOW state is the in flight state, setting the active WOW state to the on ground state in response to the FCC determining that the WOW count is two for a period greater than the two WOG timer threshold, operating the first set of hold loops and the second set of hold loops in a turned on mode and operating the first set of integrator and the second set of integrators in an unfrozen mode when the active WOW state is the in flight state, and turning off the first set of hold loops and the second set of hold loops when the active WOW state is the on ground state. In some embodiments, the second set of hold loops includes at least one hold loop that is absent from the first set of hold loops, and the second set of hold loops includes at least one hold loop that is in the first set of hold loops. In some embodiments, the first set of hold loops includes at least a position hold loop, a speed hold loop, and a heading hold loop, and the second set of hold loops includes at least the position hold loop, the speed hold loop, the heading hold loop, and an attitude hold loop. In some embodiments, the instructions for providing the first set of integrators include instructions for providing the first set of hold loops, each first hold loop of the first set of hold loops having a first integrator of the first set of integrators in a first integral signal path and having a first proportional signal path, and generating, in each first hold loop, one of the first control augmentation signals according to a first proportional signal from the first proportional signal path and a first integral signal from the first integral signal path. In some embodiments, the instructions for providing the first set of integrators include instructions for providing the second set of hold loops, each second hold loop of the second set of hold loops having a second integrator of the second set of integrators in a second integral signal path and having a second proportional signal path, and generating, in each second hold loop, one of the second control augmentation signals according to a second first proportional signal from the second proportional signal path and a second integral signal from the second integral signal path. In some embodiments, the program further include instructions for receiving feedback data at an input to an integral signal path of one of the first set of hold loops and receiving control data, at an input of a proportional signal path of one of the first set of hold loops, indicating a pilot control position.

An embodiment method for controlling a rotorcraft includes maintaining a weight on wheels (WOW) state machine having at least a single gear state, an in transit state, and an on ground state, determining an active WOW state of the WOW state machine according to one or more signals indicating a WOW count associated with a number wheels of the rotorcraft that bear weight of the rotorcraft, wherein the determining the active WOW state comprises using the in transit state as a buffer for a transition between the single gear state and the on ground state, freezing a first set of integrators in a first set of hold loops operated by a flight control computer (FCC) in response to determining that the active WOW state is the single gear state, freezing a second set of integrators in a second set of hold loops operated by the FCC in response to determining that the active WOW state is the in transit state, unfreezing the first set of integrators and the second set of integrators when the active WOW state is the in flight state, and generating control signals according to values provided by the first set of integrators and the second set of integrators when the active WOW state is one of the single gear state, the in transit state, and the in flight state.

In some embodiments, the determining the active WOW state includes setting the active WOW state to the in transit state in response to the WOW count being one and further in response to a speed of the rotorcraft being less than a landing speed threshold, setting the active WOW state to the in transit state in response to the WOW count being one for a period less than or equal to a one WOG timer threshold, in response to the speed of the rotorcraft being greater than or equal to the landing speed threshold, and further in response to a previous WOW state of the rotorcraft being the in transit state, and setting the active WOW state to the in transit state in response to the WOW count being two for a period less than or equal to a two WOG timer threshold. In some embodiments, the WOW state machine further has an in flight state, and the determining the active WOW state further includes setting the active WOW state to the single gear state in response to the WOW count being one and the speed of the rotorcraft being greater than or equal to the landing speed threshold, and further in response to one of a previous WOW state of the rotorcraft being the in flight state, or the previous WOW state of the rotorcraft being the in transit state and the WOW count being one for a period greater than the one WOG timer threshold, setting the active WOW state to the in flight state in response to the WOW count being zero, setting the active WOW state to the on ground state in response to the FCC determining that the WOW count is two for a period greater than the two WOG timer threshold, turning off the first set of hold loops and the second set of hold loops when the active WOW state is the on ground state, and operating the first set of hold loops and the second set of hold loops in a turned on mode and operating the first set of integrator and the second set of integrators in an unfrozen mode when the active WOW state is the in flight state. In some embodiments, the first set of hold loops includes at least a position hold loop, a speed hold loop, and a heading hold loop, and wherein the second set of hold loops includes at least the position hold loop, the speed hold loop, the heading hold loop, and an attitude hold loop. In some embodiments, the generating the control signals includes receiving feedback data at inputs of the first and second integral signal paths and receiving control data, at inputs of the first and second proportional signal paths, indicating a pilot control position, generating, in a first hold loop of the first set of hold loops, a first control signal according to a first proportional signal, generated according to the control data, from a first proportional signal path of a first hold loop of the first set of hold loops, wherein the first control signal is further generated according to a first integral signal, generated according to the feedback data, from a first integral signal path in which a first integrator of the first set of integrators is disposed and generated according to the feedback data, and generating, in a second hold loop of the second set of hold loops, a second control signal according to a second proportional signal, generated according to the control data, from a second proportional signal path of a second hold loop of the second set of hold loops, where the second control signal is further generated according to a second integral signal, generated according to the feedback data, from a second integral signal path in which a second integrator of the second set of integrators is disposed and generated according to the feedback data.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A rotorcraft, comprising:
a plurality of wheels, each wheel of the plurality of wheels configured to receive weight of the rotorcraft when in contact with a landing surface;

a plurality of wheel sensors, each wheel sensor of the plurality of wheel sensors associated with a respective wheel and having circuitry configured to generate a wheel on ground (WOG) signal indicating that the respective wheel is in contact with the landing surface; and a flight control computer (FCC) in signal communication with the plurality of wheel sensors, the FCC operable to execute a first hold loop having a first integrator and providing first control augmentation of a flight system of the rotorcraft, the FCC further operable to freeze the first integrator according to a number of WOG signals received from the plurality of wheel sensors, the FCC further operable to generate a first control signal according to a first value provided by the first integrator while the first integrator is frozen.

2. The rotorcraft of claim 1, wherein the FCC is further operable to monitor an active weight on wheels (WOW) state by setting the active WOW state to a state in a WOW state machine, wherein the WOW state machine has an in transit state, and wherein the FCC is further operable to freeze the first integrator when the active WOW state is the in transit state.

3. The rotorcraft of claim 2, wherein the FCC is further operable to set the active WOW state to the in transit state in response to the FCC determining that the number of WOG signals is one or greater.

4. The rotorcraft of claim 3, wherein the FCC is further operable to set the active WOW state to the in transit state in response to the FCC determining that the number of WOG signals is one and further in response to a speed of the rotorcraft being less than a landing speed threshold.

5. The rotorcraft of claim 4, wherein the FCC is further operable to set the active WOW state to the in transit state in response to the FCC determining that the number of WOG signals is one, in response to a speed of the rotorcraft being greater than or equal to the landing speed threshold, in response to a previous WOW state of the rotorcraft being the in transit state, and further in response to the number of WOG signals being one for a period less than or equal to a one WOG timer threshold.

6. The rotorcraft of claim 5, wherein the WOW state machine further includes a single gear state and an in flight state;

wherein the FCC is further operable to set the active WOW state to the single gear state in response to the FCC determining that the number of WOG signals is one, in response to the speed of the rotorcraft being greater than or equal to the landing speed threshold, and further in response to one of: a previous WOW state of the rotorcraft being the in flight state, or the previous WOW state of the rotorcraft being the in transit state and the number of WOG signals being one for a period greater than the one WOG timer threshold; and wherein the FCC is further operable to execute a second hold loop having a second integrator and providing second control augmentation of the flight system, the FCC is further operable to unfreeze the first integrator and freeze the second integrator when the active WOW state is the single gear state, and the FCC is further operable to generate a second control signal according to a second value provided by the second integrator while the second integrator is frozen;

wherein the first hold loop is a different hold loop than the second hold loop; and wherein the FCC is further operable to set the active WOW state to the in flight state in response to the FCC determining that the number of WOG signals is zero, and wherein the FCC is further operable to unfreeze the first integrator and the second integrator when the active WOW state is the in flight state.

7. The rotorcraft of claim 6, wherein the WOW state machine further includes an on ground state;

wherein the FCC is further operable to set the active WOW state to the on ground state in response to the FCC determining that the number of WOG signals is two for a period greater than a two WOG timer threshold; and wherein the FCC is further operable to turn off the first integrator and the second integrator when the active WOW state is the on ground state, and the FCC is further operable to generate the first and second control signals according to values other than values provided by the first and second integrators while the first and second integrators are turned off.

8. The rotorcraft of claim 3, wherein the FCC is further operable to set the active WOW state to the in transit state in response to the FCC determining that the number of WOG signals is two for a period less than or equal to a two WOG timer threshold.

9. A flight control computer (FCC) for a rotorcraft, comprising:

a processor; and a non-transitory computer-readable storage medium storing a program to be executed by the processor, the program including instructions for:

receiving one or more signals indicating a weight on wheels (WOW) count associated with a number wheels of the rotorcraft that bear weight of the rotorcraft;

providing a first set of integrators in a first set of hold loops that generate first control augmentation signals for a flight system of the rotorcraft;

providing a second set of integrators in a second set of hold loops that generate second control augmentation signals for the flight system;

maintaining a WOW state machine having at least a single gear state and an in transit state;

determining an active WOW state of the WOW state machine according to at least the WOW count;

freezing the first set of integrators in response to determining that the single gear state is the active WOW state, wherein the first set of hold loops generate the first control augmentation signals according to first values provided by the first set of integrators when the first set of integrators are frozen; and freezing the second set of integrators in response to determining that the in transit state is the active WOW state, wherein the second set of hold loops generate the second control augmentation signals according to second values provided by the second set of integrators when the second set of integrators are frozen.

10. The FCC of claim 9, wherein the program further include instructions for:

setting the active WOW state to the in transit state in response to the FCC determining that the WOW count is one and further in response to the FCC determining that a speed of the rotorcraft is less than a landing speed threshold;

setting the active WOW state to the in transit state in response to the FCC determining that the WOW count has been one for a period less than or equal to a one WOG timer threshold, in response to the FCC determining that the speed of the rotorcraft is greater than or equal to the landing speed threshold, and further in response to a previous WOW state of the rotorcraft is the in transit state; and setting the active WOW state to the in transit state in response to the FCC determining that the WOW count has been two for a period less than or equal to a two WOG timer threshold.

11. The FCC of claim 10, wherein the WOW state machine further has an in flight state and an on ground state; and wherein the program further including instructions for:
setting the active WOW state to the single gear state in response to the FCC determining that the WOW count is one and that the speed of the rotorcraft is greater than or equal to the landing speed threshold, and further in response to one of a previous WOW state of the rotorcraft being the in flight state, or the previous WOW state of the rotorcraft being the in transit state and the WOW count having been one for a period greater than the one WOG timer threshold;

setting the active WOW state to the in flight state in response to the FCC determining that the WOW count is zero, and wherein the FCC is further operable to unfreeze the first set of integrators and the second set of integrators when the active WOW state is the in flight state;

setting the active WOW state to the on ground state in response to the FCC determining that the WOW count is two for a period greater than the two WOG timer threshold;

operating the first set of hold loops and the second set of hold loops in a turned on mode and operating the first set of integrator and the second set of integrators in an unfrozen mode when the active WOW state is the in flight state; and turning off the first set of hold loops and the second set of hold loops when the active WOW state is the on ground state.

12. The FCC of claim 9, wherein the second set of hold loops includes at least one hold loop that is absent from the first set of hold loops, and wherein the second set of hold loops includes at least one hold loop that is in the first set of hold loops.

13. The FCC of claim 12, wherein the first set of hold loops includes at least a position hold loop, a speed hold loop, and a heading hold loop, and wherein the second set of hold loops includes at least the position hold loop, the speed hold loop, the heading hold loop, and an attitude hold loop.

14. The FCC of claim 9, wherein the instructions for providing the first set of integrators include instructions for:
providing the first set of hold loops, each first hold loop of the first set of hold loops having a first integrator of the first set of integrators in a first integral signal path and having a first proportional signal path; and
generating, in each first hold loop, one of the first control augmentation signals according to a first proportional signal from the first proportional signal path and a first integral signal from the first integral signal path; and
wherein the instructions for providing the first set of integrators include instructions for:
providing the second set of hold loops, each second hold loop of the second set of hold loops having a second integrator of the second set of integrators in a second integral signal path and having a second proportional signal path; and generating, in each second hold loop, one of the second control augmentation signals according to a second first proportional signal from the second proportional signal path and a second integral signal from the second integral signal path.

15. The FCC of claim 14, wherein the program further include instructions for:
receiving feedback data at an input to an integral signal path of one of the first set of hold loops and receiving control data, at an input of a proportional signal path of one of the first set of hold loops, indicating a pilot control position.

16. A method for controlling a rotorcraft, comprising:
maintaining a weight on wheels (WOW) state machine having at least a single gear state, an in transit state, and an on ground state;
determining an active WOW state of the WOW state machine according to one or more signals indicating a WOW count associated with a number wheels of the rotorcraft that bear weight of the rotorcraft, wherein the determining the active WOW state comprises using the in transit state as a buffer for a transition between the single gear state and the on ground state;
freezing a first set of integrators in a first set of hold loops operated by a flight control computer (FCC) in response to determining that the active WOW state is the single gear state;
freezing a second set of integrators in a second set of hold loops operated by the FCC in response to determining that the active WOW state is the in transit state;
unfreezing the first set of integrators and the second set of integrators when the active WOW state is an in flight state; and
generating control signals according to values provided by the first set of integrators and the second set of integrators when the active WOW state is one of the single gear state, the in transit state, and the in flight state.

17. The method of claim 16, wherein the determining the active WOW state comprises:
setting the active WOW state to the in transit state in response to the WOW count being one and further in response to a speed of the rotorcraft being less than a landing speed threshold;
setting the active WOW state to the in transit state in response to the WOW count being one for a period less than or equal to a one WOG timer threshold, in response to the speed of the rotorcraft being greater than or equal to the landing speed threshold, and further in response to a previous WOW state of the rotorcraft being the in transit state; and
setting the active WOW state to the in transit state in response to the WOW count being two for a period less than or equal to a two WOG timer threshold.

18. The method of claim 17, wherein the WOW state machine further has an in flight state; and
wherein the determining the active WOW state further comprises:
setting the active WOW state to the single gear state in response to the WOW count being one and the speed of the rotorcraft being greater than or equal to the landing speed threshold, and further in response to one of a previous WOW state of the rotorcraft being the in flight state, or the previous WOW state of the rotorcraft being the in transit state and the WOW count being one for a period greater than the one WOG timer threshold;

setting the active WOW state to the in flight state in response to the WOW count being zero;

setting the active WOW state to the on ground state in response to the FCC determining that the WOW count is two for a period greater than the two WOG timer threshold;

turning off the first set of hold loops and the second set of hold loops when the active WOW state is the on ground state; and operating the first set of hold loops and the second set of hold loops in a turned on mode and operating the first set of integrator and the second set of integrators in an unfrozen mode when the active WOW state is the in flight state.

19. The method of claim 16, wherein the first set of hold loops includes at least a position hold loop, a speed hold loop, and a heading hold loop, and wherein the second set of hold loops includes at least the position hold loop, the speed hold loop, the heading hold loop, and an attitude hold loop.

20. The method of claim 16, wherein the generating the control signals comprises:

receiving feedback data at inputs of a first integral signal path and a second integral signal path and receiving control data, at inputs of a first proportional signal path and a second proportional signal path, indicating a pilot control position;

generating, in a first hold loop of the first set of hold loops, a first control signal according to a first proportional signal, generated according to the control data, from a first proportional signal path of a first hold loop of the first set of hold loops, wherein the first control signal is further generated according to a first integral signal, generated according to the feedback data, from a first integral signal path in which a first integrator of the first set of integrators is disposed and generated according to the feedback data; and generating, in a second hold loop of the second set of hold loops, a second control signal according to a second proportional signal, generated according to the control data, from a second proportional signal path of a second hold loop of the second set of hold loops, wherein the second control signal is further generated according to a second integral signal, generated according to the feedback data, from a second integral signal path in which a second integrator of the second set of integrators is disposed and generated according to the feedback data.

* * * * *